United States Patent

Uchida et al.

[11] Patent Number: 5,158,375
[45] Date of Patent: Oct. 27, 1992

[54] COMBINED RADIAL AND THRUST BEARING

[75] Inventors: Kazuo Uchida, Nara; Atsushi Nakano, Osaka, both of Japan

[73] Assignee: Koyo Seiko Co., Ltd., Osaka, Japan

[21] Appl. No.: 749,854

[22] Filed: Aug. 26, 1991

[30] Foreign Application Priority Data

Aug. 28, 1990 [JP] Japan .................. 2-90311[U]

[51] Int. Cl.$^5$ ............................................. F16C 19/14
[52] U.S. Cl. ....................................... 384/455; 384/620
[58] Field of Search ............... 384/455, 454, 453, 452, 384/617, 620, 622

[56] References Cited

U.S. PATENT DOCUMENTS

| | | | |
|---|---|---|---|
| 3,930,692 | 1/1976 | Condon et al. | 384/455 |
| 4,971,460 | 11/1990 | Muntnich et al. | 384/455 |
| 4,981,373 | 1/1991 | Bando | 384/622 |
| 5,114,249 | 5/1992 | Muntnich et al. | 384/622 |

Primary Examiner—Lenard A. Footland
Attorney, Agent, or Firm—Mason, Fenwick & Lawrence

[57] ABSTRACT

A combined radial and thrust bearing comprising: a radial rolling bearing including an outer ring provided with a large-diameter cylindrical portion the inner peripheral surface of which constitutes a raceway of rollers, a small-diameter cylindrical portion which extends from one end of the large-diameter cylindrical portion for carrying a thrust rolling bearing and which has a smaller diameter than the large-diameter cylindrical portion and a plurality of projections for preventing the thrust rolling bearing which is provided on the periphery at the end portion of the small-diameter cylindrical portion from coming off, and a plurality of rollers disposed on the inner peripheral surface of the outer ring and held by a retainer at regular circumferential intervals; and a thrust rolling bearing including axially arranged first race and second race, the first race being composed of an annular plate, a plurality of rollers disposed and held by an annular retainer at regular circumferential intervals and the second race being composed of an outer cylindrical portion and an annular plate portion, wherein the first race and the annular retainer of the thrust rolling bearing are placed over the small-diameter cylindrical portion of the radial rolling bearing, and each of the projections is engaged with the outer periphery of the opening of the retainer so as to prevent the thrust rolling bearing from coming off the radial rolling bearing. Assembly and processing of a combined radial and thrust bearing are facilitated and the performance thereof is increased.

2 Claims, 3 Drawing Sheets

COMBINED RADIAL AND THRUST BEARING

BACKGROUND OF THE INVENTION

1. Field of the Invention

The present invention relates to a combined radial and thrust bearing.

2. Description of the Prior Art

A combined radial and thrust bearing is generally used, for example, a sliding hinging portion for opening and closing a door along the vehicle body of an automobile.

An example of a conventional combined radial and thrust bearing (see U.S. Pat. No. 3,930,692) will be explained with reference to FIGS. 5 and 6. FIG. 5 is a side elevational view thereof and FIG. 6 is a sectional view thereof shown in FIG. 5, taken along the line VI—VI.

The combined radial and thrust bearing shown in FIGS. 5 and 6 is composed of a radial rolling bearing A and a thrust rolling bearing B and supports the linear relative movement of a first member C and a second member D.

The radial rolling bearing A is composed of an outer ring 1, a plurality of rollers 2 disposed between the inner periphery of the outer bearing race 1 and the second member D, and a retainer 3 for holding the plurality of rollers 2 at regular circumferential intervals. The outer ring 1 is provided with a large-diameter cylindrical portion 4 and a small-diameter cylindrical portion 6 which has a smaller diameter than the large-diameter cylindrical portion 4 and which has several projections 5 projecting outwardly in the diametrical direction on the periphery at one end portion thereof.

The thrust rolling bearing B is composed of two races 7 and 8, a plurality of rollers 9 disposed between the races 7 and 8, and a retainer 10 for holding the plurality of rollers 9 at regular circumferential intervals. The retainer 10 for holding the rollers 9 is attached to the two races 7 and 8 inseparably therefrom. The first race 7 is composed of an annular plate portion 11 and an inner cylindrical portion 12 which is integrally provided on the inner periphery of the annular plate portion 11. At several portions on the inner periphery of the inner cylindrical portion 12 are provided notches 13 which correspond to the projections 5 of the small-diameter cylindrical portion 6, and projections 14 for preventing the retainer 10 from coming off. The second race 8 is composed of an annular plate portion 15 and an outer cylindrical portion 16 which is integrally provided on the outer periphery of the annular plate portion 15. At several portions on the outer periphery of the outer cylindrical portion 16 are provided projections 17 which project inwardly in the diametrical direction so as to prevent the holder 10 from coming off.

By fitting the inner cylindrical portion 12 of the first race 7 of the thrust rolling bearing B over the small-diameter cylindrical portion 6 of the outer ring 1 of the radial rolling bearing A, and caulking the end portion of the small-diameter cylindrical portion 6, the radial rolling bearing A and the thrust rolling bearing B are united into one body.

A combined radial thrust bearing having the above-described structure, however, has the following problems.

The small-diameter cylindrical portion 6 is caulked toward the first race 7 of the thrust rolling bearing B in order to unite the radial rolling bearing A and the thurst rolling bearing into one body. The caulking operation itself is troublesome and increases the number of assembling steps, thereby lowering the manufacturing efficiency.

Since the inner cylindrical portion 12 of the first race 7 of the thrust rolling bearing B is fitted over the small-diameter cylindrical portion 6 of the radial rolling bearing A so as to unite them into one body and the wall of the cylindrical portion 12 is overlaid on the wall of the cylindrical portion 12 in the diametrical direction, the dimensions of the outer diameter of the small-diameter cylindrical portion 6 of the radial rolling bearing A and the outer diameter of the thrust rolling bearing B are restricted to predetermined dimensions. The length in the diametrical direction of the retainer 10 for holding the thrust rollers 9 is therefore shortened by the dimension equivalent to the total wall thickness of the cylindrical portions 6 and 12, so that the length of the thrust roller 9 is also restricted. Thus, the load capacity of the thrust rolling bearing B is insufficient.

Since the width of the thrust rolling bearing B required for assembly is different depending upon the object to which the bearing B is attached, the dimension is conventionally adjusted by varying the thickness of the annular plate portion 11 of the first race 7 of the thrust rolling bearing B. However, if the thickness of the annular plate portion 11 is increased, the thickness of the inner cylindrical portion 12 which is integral with the annular plate portion 11 is also increased. The total wall thickness of the cylindrical portions 6 and 12 is therefore increased, thereby aggravating the above-described problem.

SUMMARY OF THE INVENTION

Accordingly, it is a first object of the present invention to eliminate the above-described problems in the prior art and to provide a combined radial and thrust bearing which is easily assembled by a small number of steps.

It is a second object of the present invention to provide a combined radial thrust bearing in which the thrust rolling bearing has a large load capacity.

To achieve these aims, a combined radial and thrust bearing of the present invention comprises: a radial rolling bearing including an outer ring provided with a large-diameter cylindrical portion the inner peripheral surface of which constitutes a raceway of rollers, a small-diameter cylindrical portion which extends from one end of the large-diameter cylindrical portion for carrying a thrust rolling bearing and which has a smaller diameter than the large-diameter cylindrical portion and a plurality of projections for preventing the thrust rolling bearing which is provided on the periphery at the end portion of the small-diameter cylindrical portion from coming off, and a plurality of rollers disposed on the inner peripheral surface of the outer ring and held by a retainer at regular circumferential intervals; and a thrust rolling bearing including axially arranged first race and second race, the first race being composed of an annular plate, a plurality of rollers disposed and held by an annular retainer at regular circumferential intervals, and the second race being composed of an outer cylindrical portion and an annular plate portion, wherein the first race and the annular retainer of the thrust rolling bearing are placed over the small-diameter cylindrical portion of the radial rolling bearing, and each of the projections is engaged with the outer periphery of the opening of the annular retainer so as to prevent the thrust rolling bearing from coming off the radial rolling bearing.

Since each of the projections for preventing the thrust rolling bearing from coming off the radial rolling bearing is engaged with the outer periphery of the opening of the annular holder in the state in which the thrust rolling bearing is placed over the small-diameter cylindrical portion of the radial rolling bearing, the thrust rolling bearing is prevented from coming off the radial rolling bearing, so that assembly of the thrust rolling bearing and the radial rolling bearing is facilitated without the need for caulking, which is required in the prior art.

In addition, since the first race of the thrust rolling bearing is in the form of an annular plate and it has not provided with a cylindrical portion which is placed over the small-diameter cylindrical portion of the radial rolling bearing, it is possible to make the length of the holder in the diametrical direction and the length of the thrust rolling bearing greater than the conventional ones by the dimension equivalent to the wall thickness of both cylindrical portions, so that the load capacity of the thrust rolling bearing is increased to that degree.

In a combined radial and thrust bearing of the type in which the first race is separated from the retainer and the second race is not separated from the retainer, the first race is provided with notches for passing the corresponding projections therethrough when the thrust rolling bearing is placed over the small-diameter portion and the inner diameter of the retainer is made to be slightly smaller than the diameter of the circumscribing circle of each of the projections of the small-diameter cylindrical portion.

Due to the above-described structure, when the first race is placed over the small-diameter portion, since the projections of the small-diameter cylindrical portion allow the notches of the first race to pass therethrough, the first race is smoothly mounted. On the other hand, when the assembly of the retainer and the second race is placed over the small-diameter cylindrical portion, since the inner diameter of the retainer is set at a slightly smaller diameter than the diameter of the circumscribing circle of each of the projections, although the inner diameter portion of the retainer is caught by the projections, the assembly is interlocked with the small-diameter cylindrical portion merely by pushing the retainer thereinto.

The above and other objects, features and advantages of the present invention will become clear from the following description of the preferred embodiment thereof, taken in conjunction with the accompanying drawings.

BRIEF DESCRIPTION OF THE DRAWINGS

FIGS. 1 to 4 show an embodiment of the present invention, wherein

FIG. 1 is a vertical sectional view of the upper half portion of a combined radial and thrust bearing;

FIG. 2 is a side elevational view of the embodiment shown in FIG. 1 in the state in which a first thrust race of a thrust rolling bearing is placed over the small-diameter cylindrical portion of the radial rolling bearing;

FIG. 3 is a sectional view of the embodiment shown in FIG. 2, taken along the line III—III; and FIG. 4 is a vertical sectional view of the embodiment shown in FIG. 1 in the state in which the retainer of the thrust rolling bearing and a second thrust race are placed over the small-diameter cylindrical portion of the radial rolling bearing; and FIGS. 5 and 6 show a conventional combined radial and thrust bearing; wherein FIG. 5 is a side elevational view of a part of a combined radial and thrust bearing; and FIG. 6 is a sectional view of the part of a combined radial and thrust bearing shown in FIG. 5, taken along the line VI—VI.

DESCRIPTION OF THE PREFERRED EMBODIMENT

An embodiment of the present invention will be explained in detail with reference to the accompanying drawings.

Figure 5:
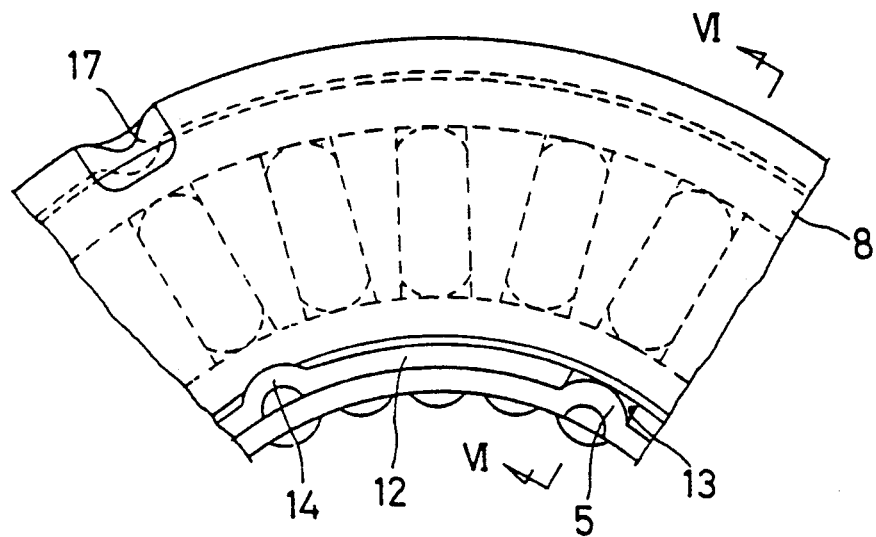
Figure 6:
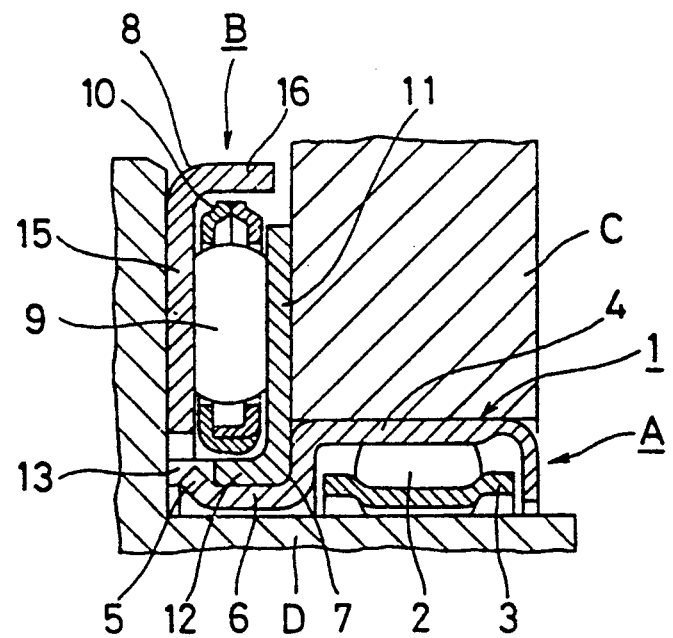

An embodiment of the present invention is shown in FIGS. 1 to 4. The same reference numerals are provided for the elements which are the same as those shown in the conventional bearing shown in FIGS. 5 and 6.

The radial rolling bearing A is composed of the outer ring 1, the plurality of rollers disposed between the inner periphery of the outer ring 1 and the second member D, and the retainer for holding the plurality of rollers 2 at regular circumferential intervals. The outer ring 1 is provided with the large-diameter cylindrical portion 4 which constitutes a raceway and the small-diameter cylindrical portion 5 which has a small-diameter than the large-diameter cylindrical portion and which has the several projections 5 projecting outwardly in the diametrical direction on the periphery of at one end thereof.

The thrust rolling bearing B is composed of first and second races 7a, 8a, the plurality of rollers 9 disposed between the first and second races 7a, 8a, and a holder 10a for holding the plurality of rollers 9 at regular circumferential intervals. The retainer 10a for holding the rollers 9 is attached to the second race 8a inseparably therefrom and separately from the first race 7a. The first race 7a is merely composed of an annular plate with several notches 20 formed on the inner periphery thereof. The notch has a size which allows the projection 5 of the outer ring 1 of the radial rolling bearing A to pass therethrough. After the notches are formed on the first race 7a, it is hardened. The second race 8a is composed of the annular plate portion 15 and the outer cylindrical portion 16 which is integrally provided on the outer periphery of the annular plate portion 15. Several projections 17 which project inwardly in the diametrical direction are provided on the periphery of the outer cylindrical portion 16 so as to prevent the retainer 10a from coming off. The retainer 10a is composed of two annular places and the inner diameter thereof is set at a slightly small dimension than the circumscribing circle of each projection 5 of the small-diameter cylindrical portion 6 of the radial rolling bearing A. The second race 8a is attached to the retainer 10a inseparably therefrom.

The thrust rolling bearing B is mounted on the small-diameter cylindrical portion 6 of the outer ring 1 of the radial rolling bearing A, whereby a combined radial and thrust bearing is completed.

The structure and steps for mounting the thrust rolling bearing B on the radial rolling bearing A will be explained hereinunder.

Figure 1:
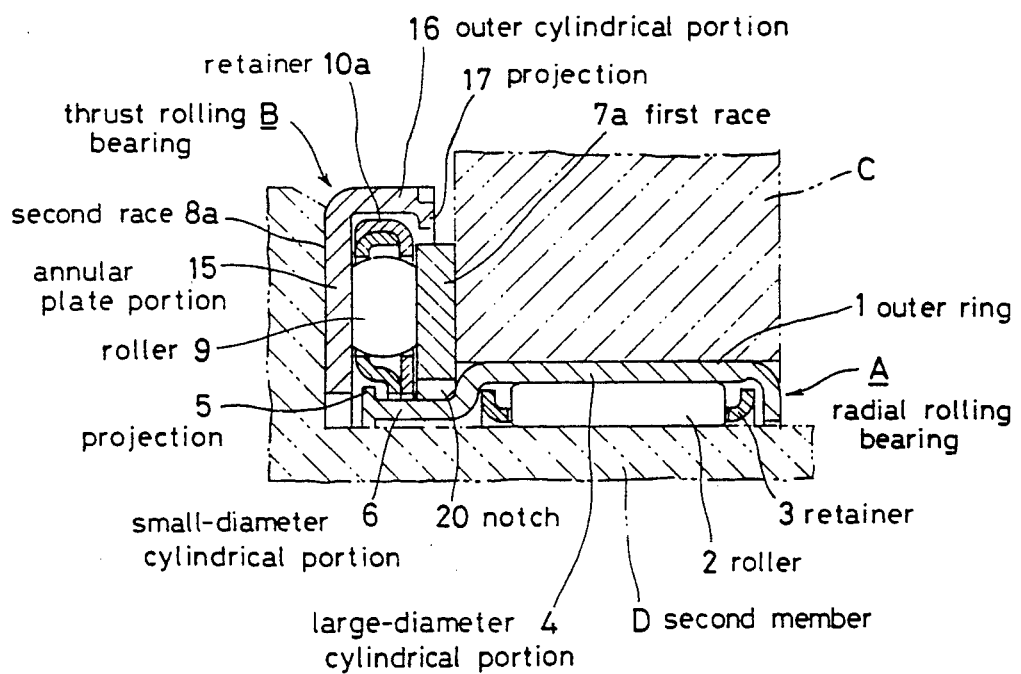
Figure 2:
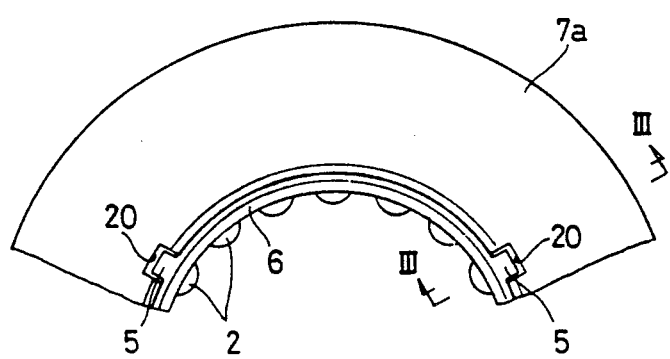
Figure 3:
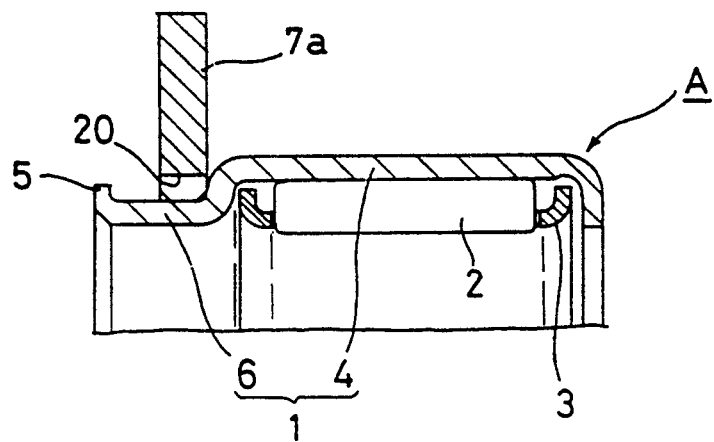

The first race 7a of the thrust rolling bearing B is first placed at the small-diameter cylindrical portion 6 so that the notches 20 of the first race 7a are opposed to the corresponding projections formed at one end portion of the small-diameter cylindrical portion 6, and in this state the first race 7a is fitted over the small-diameter portion 6 toward the proximal end thereof (see FIGS. 2 and 3).

Figure 4:
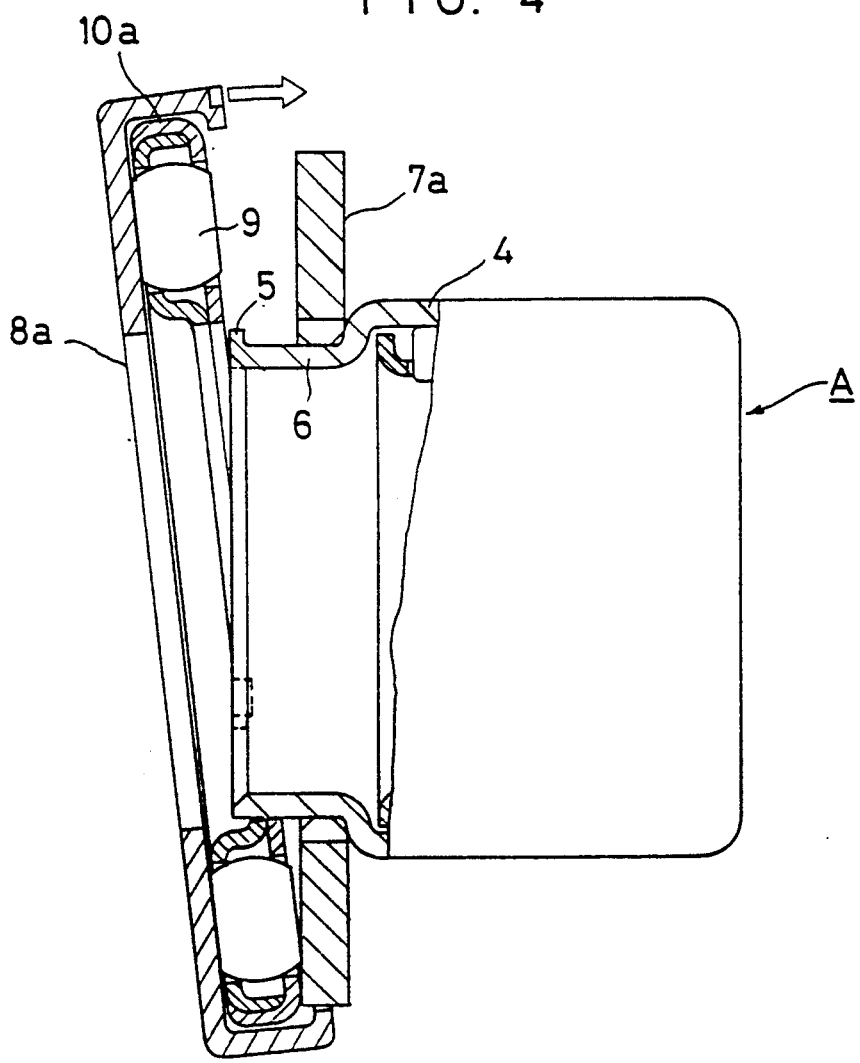

Thereafter, the second race 8a is attached to the retainer 10a inseparably therefrom, and the assembly is mounted on the small-diameter portion 6 of the radial rolling bearing A. At this time, as shown in FIG. 4, the inner peripheral portion of the retainer 10a is first engaged with two of the three projections 5 in the state in which the retainer 10a is inclined, and the retainer 10a is then press fitted to the small-diameter cylindrical portion 6 by engaging the inner periphery of the retainer 10a with the other projection 5. In this way, the retainer 10a is prevented from coming off by the projections 5 of the small-diameter cylindrical portion 6.

As described above, according to the present invention, since the mounting portion at which the thrust rolling bearing is mounted on the radial rolling bearing is not doubled by cylindrical portions as in the prior art, it is possible to increase the length in the diametrical direction of the retainer pocket of the thrust rolling bearing and, hence, to increase the load capacity of the thrust rolling bearing as compared with the prior art. Especially, since the structure in which two cylindrical portions are inserted with one into the other is obliterated, it is possible to prevent the load capacity of the thrust rolling bearing from varying with a change in the width of the thrust rolling bearing required for assembly, which is adjusted by increasing or decreasing the width of the first race in the prior art. That is, adjustment of the width of the thrust rolling bearing is facilitated.

In addition, since the projections of the small-diameter cylindrical portion of the radial rolling bearing for preventing the thrust rolling bearing from coming off are formed before the thrust rolling bearing is mounted on the small-diameter portion, the caulking step in the prior art is dispensed with.

Thus, a combined radial and thrust bearing of the present invention facilitates assembly and processing thereof and increases the performance.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A combined radial and thrust bearing comprising:
    a radial rolling bearing including an outer ring provided with a large-diameter cylindrical portion the inner peripheral surface of which constitutes a raceway of rollers, a small-diameter cylindrical portion which extends from one end of said large-diameter cylindrical portion for carrying a thrust rolling bearing and which has a smaller diameter than said large-diameter cylindrical portion, and a plurality of projections for preventing said thrust rolling bearing which is provided on the periphery at one end portion of said small-diameter cylindrical portion from coming off, and a plurality of rollers disposed on the inner peripheral surface of said outer ring and held by a retainer at regular circumferential intervals; and
    a thrust rolling bearing including axially arranged first race and second race, said first race being composed of an annular plate and a plurality of rollers disposed and held by an annular retainer at regular circumferential intervals, and said second race being composed of an outer cylindrical portion and an annular plate portion,
    said first race and said retainer of said thrust rolling bearing being placed over said small-diameter cylindrical portion of said radial rolling bearing; and
    each of said projections being engaged with the outer periphery of the opening of said annular retainer so as to prevent said thrust rolling bearing from coming off said radial rolling bearing.

2. A combined radial and thrust bearing according to claim 1, wherein said first race is separated from said annular retainer while said second race is inseparable from said annular retainer, said first race is provided with notches for allowing said projections to pass therethrough when said first race is places over said small-diameter cylindrical portion, and the inner diameter of said annular retainer is slightly smaller than the diameter of a circumscribing circle of each of said projections.

* * * * *